W. H. BROWN.
LUBRICATOR.
APPLICATION FILED DEC. 2, 1916.
1,216,411.
Patented Feb. 20, 1917.
2 SHEETS—SHEET 1.
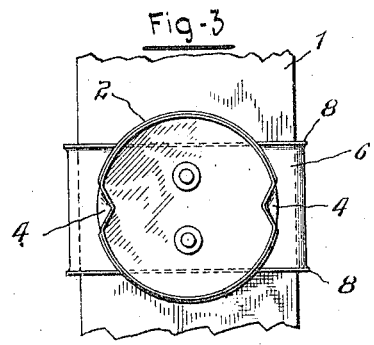
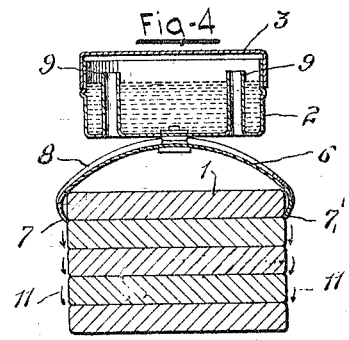
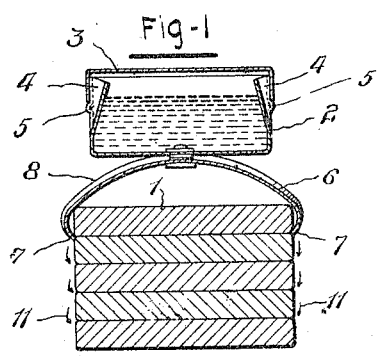
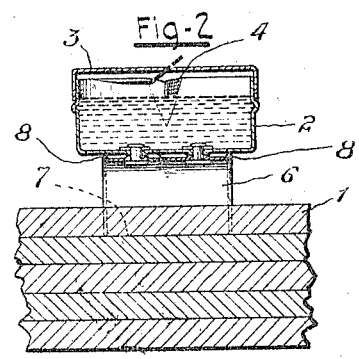
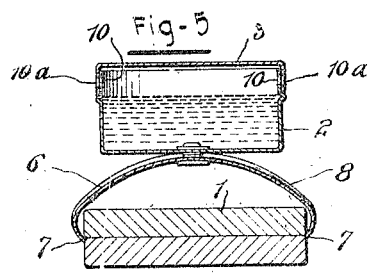
Inventor:
William H. Brown,
by Frank L. Sessions
Attorney

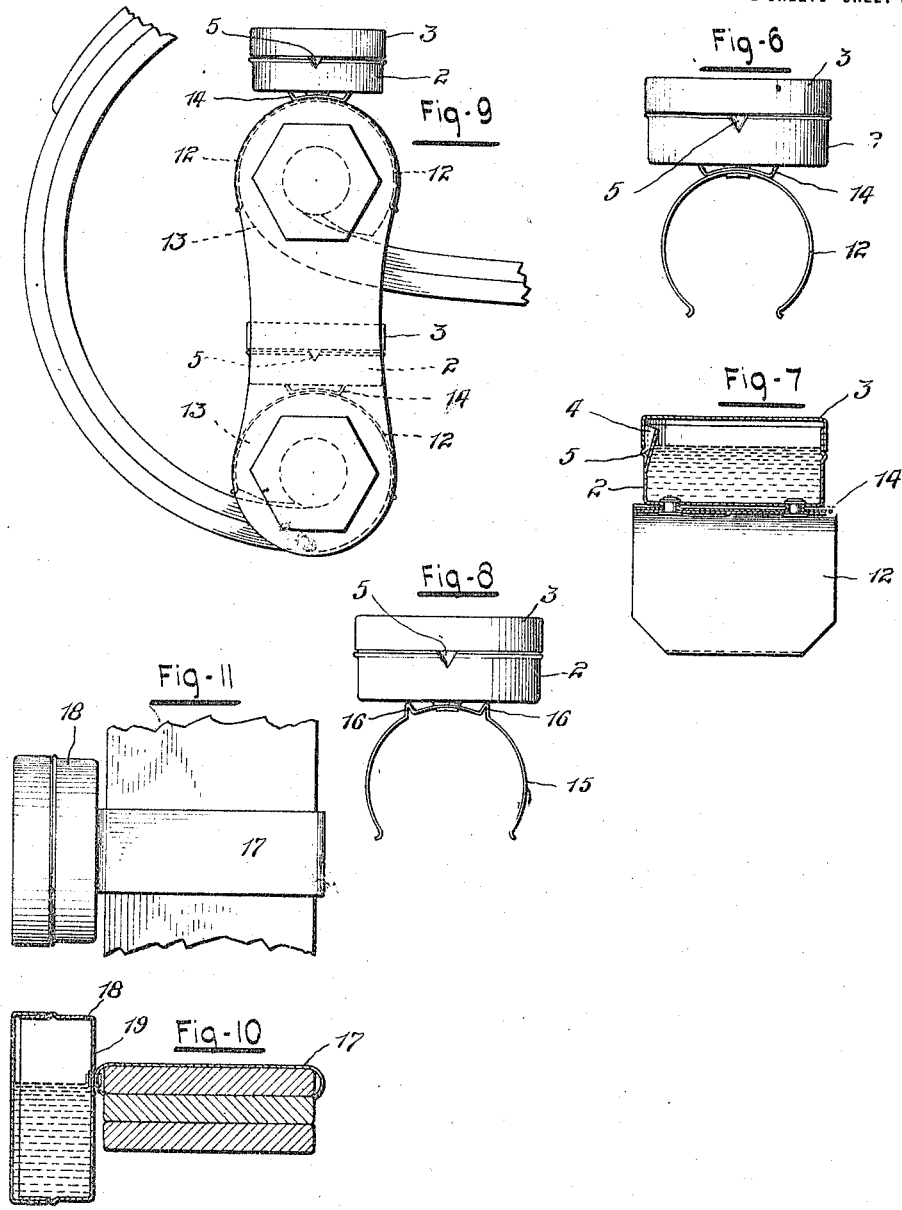

UNITED STATES PATENT OFFICE.

WILLIAM H. BROWN, OF CLEVELAND, OHIO.

LUBRICATOR.

1,216,411.  Specification of Letters Patent.  Patented Feb. 20, 1917.

Application filed December 2, 1916.  Serial No. 134,706.

*To all whom it may concern:*

Be it known that I, WILLIAM H. BROWN, a citizen of the United States, residing at Cleveland, in the county of Cuyahoga and State of Ohio, have invented certain new and useful Improvements in Lubricators, of which the following is a specification.

My invention relates to devices for supplying lubricant to sliding friction surfaces, and is especially adapted to supply lubricant to the surfaces of leaf springs. My invention may be employed to lubricate the contact surfaces between any two relatively moving members of any structure requiring lubricant, provided the parts are suitably formed for the attachment of the lubricator. It is particularly adapted to be attached to a part which is subjected to reciprocating, oscillating, or vibratory movement.

The principal object of my invention is to provide a light, simple, cheap and efficient means for lubricating the contacting surfaces between the leaves of leaf springs, such as are ordinarily employed upon automobiles and other road vehicles.

Another object of my invention is to provide a lubricator which can be readily and quickly attached to the spring and which requires no screws or adjustable clamps for attaching it.

In the drawings, Figure 1 is a vertical section through one of my improved oilers mounted upon a multiple leaf spring, the section being taken in a plane transverse to the spring.

Fig. 2 is a vertical section of my invention in a plane at right angles to that of Fig. 1.

Fig. 3 is a plan view of the oiler shown in Figs. 1 and 2, with cover removed.

Fig. 4 is a vertical section of an oiler embodying my improvements in which a different form of aperture is provided for discharging the oil.

Fig. 5 is a vertical section showing an adjustable oil discharge aperture.

Fig. 6 is a side view, and Fig. 7 is a transverse, vertical section of one of my lubricators adapted to be secured to the end of a spring for lubricating the shackle bolt.

Fig. 8 shows a modified form of the lubricator illustrated in Figs. 6 and 7.

Fig. 9 shows the application of these shackle bolt lubricators to the ends of leaf springs.

Fig. 10 is a vertical section through one of my lubricators in which the receptacle is supported at the side of the spring which is to be lubricated.

Fig. 11 is a plan view of the lubricator shown in Fig. 10.

Referring to the drawings, 1 represents the uppermost leaf of a multiple leaf spring. It is immaterial how many leaves compose the spring. For purposes of illustration, I have shown a spring composed of five leaves at the point where the oiler is attached.

In the preferred form of my invention, I provide an oil receptacle, 2, consisting of an ordinary sheet metal box such as those used as containers for small articles, medicinal tablets, compounds, etc. The box is provided with its usual cover, 3. At opposite sides of the box, I make V-shaped indentations, 4, in the top edges, forming apertures, 5, between the sides of the box, and the cover, 3.

To the bottom of the box I attach by riveting or other means, a spring clip, 6, of substantially semi-elliptical form, having its ends, 7, curved slightly inward to engage the spring to which the oiler is to supply lubricant. I have shown the edges 8, of the spring clip curved upward to prevent the oil from flowing over the sides of the clip, and to conduct the oil to the ends of the clip where it will be delivered to the point between the uppermost and adjacent spring leaves. The spring clip thus forms not only a means for attaching the oil receptacle to the parts to be lubricated, but also forms a means for receiving the oil discharged from the receptacle, and for conducting it to the joint to be lubricated. It will be understood that any other means for attaching the receptacle to the spring may be employed, which means is adapted to receive the oil discharged from the receptacle and conducting it to the joint to be lubricated.

In the use of my improved spring oiler, it is secured to the uppermost leaf of a spring in the manner shown in Figs. 1, 2 and 3, the spring clip, 6, being formed so that its ends have to be sprung apart to be applied to the top leaf of the spring, the elasticity of the spring clip, 6, holding the oiler firmly in place. The oiler being mounted upon the spring, the cap or cover, 3, is removed, and the oil receptacle, 2, is filled with fluid, lubricating oil, and the cover, 3, replaced.

As soon as the vehicle is put in motion, the vehicle springs start to vibrate, as is well known, and the oil receptacle, therefore, is subjected to continuous vibrations and movement in almost every direction. The surface of the oil contained in the receptacle is therefore continually agitated, and some of the oil slops over the edges of the V shaped indentations, 4, or creeps over by capillary attraction. This oil runs down the sides of the receptacle onto the surface of the spring clip, 6, and is conducted over its surface to the ends, 7, from which it runs onto the spring and enters the joints between the leaves by gravity and capillary attraction. Most of the oil which reaches the spring will enter the joint between the uppermost and adjacent leaves as the ends, 7, contact with the uppermost leaf near this joint, but, after a certain amount of oil has entered this joint, capillary attraction will be satisfied, and thereafter the oil will flow out from between these leaves, run over the edges of the lower leaves, and be drawn into the joints between them as shown by the arrows, 11, so that the entire spring will be thoroughly lubricated.

I have found it advisable to apply an oiler to each end of a semi-elliptical spring, due to the fact that the leaves of such a spring are generally clamped tightly at the center of the spring so that oil does not pass readily from one end to the other.

In Fig. 4, I have shown an oil receptacle similar to that shown in Figs. 1, 2 and 3, with the exception that the V shaped indentations, 4, are not formed, but instead of them I have shown tubular outlets, 9, 9, rising from the bottom of the oil receptacle. Other modifications of the outlet aperture for the lubricant will occur to those skilled in the art, such, for instance, as a plain hole such as is shown in Fig. 5, or a series of holes through the side of the receptacle.

In Fig. 5 is a vertical section of an oil receptacle having an oil discharge aperture, 10, in its side, above the normal top level of the oil. A corresponding aperture, 10ª, in the side wall of the cover, 3, permits the lubricant to escape to the top of the attachment clip. It will be understood that by revolving the cover, 3, upon the receptacle, 2, the holes, 10 and 10ª, may be relatively displaced so that the oil discharge aperture, 10, may be partly or entirely closed by the side wall of the cover, and the flow of oil be thus regulated. It will be understood that such apertures or others, may be employed without departing from the scope of my invention.

In Figs. 6, 7, 8 and 9, there is shown an adaptation of my invention to the lubrication of spring shackle bolts. The oil receptacle employed in such an adaptation may be similar in every way to those shown in Figs. 1 to 5, but the attaching clip has to be formed to suit the member to which it is to be attached. In this case the clip, 12, is adapted to be sprung over and to secure itself to the cylindrical end, 13, of the spring. Between the receptacle and the attaching clip, 12, there may be secured an oil conductor, 14, (shown in Figs. 6 and 7), on to which the oil discharges from the receptacle, and by which it is conducted to a point where it readily flows to the joint to be lubricated. In Fig. 8 the oil conductor, 14, is not shown, but the clip, 15, is provided with ribs, 16, 16, which forms a channel to receive the oil discharged from the receptacle and to conduct it to the joint to be lubricated.

In Figs. 10 and 11, there is shown one of my lubricators in which the attaching clip, 17, supports the receptacle, 18, at the side of the spring. The oil discharge aperture, 19, in this case is located in the side of the receptacle above the normal level of the oil in the receptacle and the oil is discharged on to the clip, 17, from which it flows to the joints to be lubricated. This arrangement is desirable for use where there is too limited space above the spring to receive the form of lubricator shown in Figs. 1 to 5.

The application and operation of my improved oiling device are obvious. The attachment clip bearing the oil receptacle having been attached to one of the friction members so that the oil will be conducted to the joint to be lubricated, oil is placed in the receptacle and thereafter the proper lubrication of the joint will continue, so long as there is oil in the receptacle.

I claim and desire to secure by Letters Patent:

1. A lubricator comprising a receptacle for containing a supply of oil, and means for attaching the receptacle to one of a pair of relatively moving machine elements having surfaces in frictional contact with each other, said means holding the receptacle always in an upright position, said receptacle being provided with a discharge aperture above the normal level of the oil in said receptacle.

2. A lubricator comprising a receptacle for containing a supply of oil, means for attaching the receptacle to one of a pair of relatively moving machine elements having surfaces in frictional contact with each other, said means holding the receptacle always in an upright position, said receptacle being provided with a discharge aperture above the normal level of the oil in said receptacle and means for regulating the flow of oil through said aperture.

3. A lubricator comprising a receptacle for containing a supply of oil, means for attaching the receptacle to one of a pair of relatively moving machine elements having surfaces in frictional contact with each other, said means holding the receptacle always in an upright position, said receptacle being provided with a discharge aperture, adapted to discharge oil on to said attaching means, and said attaching means being adapted to conduct the oil to said frictional contact surfaces.

4. In a spring oiler for multi-ply leaf springs, a metal clip adapted to be self secured to the top leaf of the spring, and an oil receptacle secured thereto, said receptacle being provided with an oil discharge aperture above the normal level of the oil in the receptacle.

5. In a spring oiler for multi-ply leaf-springs, a metal clip adapted to be self secured to the top leaf of the spring, an oil receptacle secured thereto, said receptacle being provided with an oil discharge aperture, and means for regulating the flow of oil through said aperture.

6. In a spring oiler, a metal clip adapted to be secured to a leaf of the spring, and an oil receptacle secured thereto, said receptacle being provided with an oil discharge aperture adapted to discharge oil onto said clip.

7. In a spring oiler, a metal clip adapted to be secured to a leaf of the spring, and an oil receptacle secured thereto, said receptacle being provided with an oil discharge aperture adapted to discharge oil onto said clip, and said clip being adapted to conduct the oil to a joint between a pair of leaves of the spring.

8. A lubricator comprising a receptacle for containing a supply of oil, and means for attaching the receptacle to the upper one of two adjacent spring leaves, said receptacle being provided with a discharge aperture above the normal level of the oil in said receptacle.

9. A lubricator comprising a receptacle for containing a supply of oil, means for attaching the receptacle to the upper one of two adjacent spring leaves, said receptacle being provided with a discharge aperture above the normal level of the oil in said receptacle, and means for regulating the flow of oil through said aperture.

10. A lubricator comprising a receptacle for containing a supply of oil, means for attaching the receptacle to the upper one of two adjacent spring leaves, said receptacle being provided with a discharge aperture, and means for regulating the flow of oil through said aperture.

11. A lubricator comprising a receptacle for containing a supply of oil, said receptacle being provided with a discharge aperture; means for attaching the receptacle to one of a pair of relatively moving machine elements having surfaces in frictional contact with each other, said means holding the receptacle always in an upright position, and means for conducting the oil which flows from said discharge aperture to said surfaces.

12. An automatic oiler embodying an oil cup provided with a delivery opening near its top and a spring clamp fastened to the cup intermediate the ends of the clamp, said clamp having its resilient ends free to resiliently clamp a support.

13. An automatic oiler embodying an oil cup provided with a delivery opening near its top and a spring clamp fastened to the cup intermediate the ends of the clamp, said clamp having free resilient end-portions bent downwardly and inwardly to resiliently clamp a support.

14. An automatic oiler embodying an oil cup provided with a delivery opening near its top and a spring clamp fastened to the cup intermediate the ends of the clamp, said clamp having its resilient ends free to resiliently clamp a support, said delivery opening being directly above the clamp so as to deliver the oil onto the clamp whence it runs down to the part to be lubricated.

15. An automatic oiler embodying an oil cup provided with a delivery opening near its top and a spring clamp fastened to the cup intermediate the ends of the clamp, said clamp having its resilient ends free to resiliently clamp a support, said delivery opening being formed in the side wall of the cup directly above the clamp so as to deliver the oil onto the clamp whence it runs down to the part to be lubricated.

16. An automatic oiler embodying an oil cup provided with a delivery opening in its side wall near its top, a cover rotatively mounted on said cup and provided with a delivery opening adapted to register with the opening in the cup wall, whereby by turning the cover the feed may be either cut off entirely or regulated, and means connected to the cup for attaching the same to the part to be oiled.

In testimony whereof I affix my signature in the presence of two witnesses.

WILLIAM H. BROWN

Witnesses:
 FRANCES K. MANN,
 ALFRED C. NELSON.